United States Patent
Petzold et al.

(10) Patent No.: US 8,000,869 B2
(45) Date of Patent: Aug. 16, 2011

(54) METHOD FOR DETERMINING A TORQUE CHARACTERISTIC OF AN AUTOMATED FRICTION CLUTCH

(75) Inventors: Rainer Petzold, Friedrichshafen (DE); Peter Herter, Ravensburg (DE); Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 506 days.

(21) Appl. No.: 12/297,364

(22) PCT Filed: Apr. 25, 2007

(86) PCT No.: PCT/EP2007/054011
§ 371 (c)(1),
(2), (4) Date: Oct. 16, 2008

(87) PCT Pub. No.: WO2007/125062
PCT Pub. Date: Nov. 8, 2007

(65) Prior Publication Data
US 2009/0090591 A1    Apr. 9, 2009

(30) Foreign Application Priority Data
Apr. 28, 2006 (DE) .......................... 10 2006 019 824

(51) Int. Cl.
    *G06F 7/00* (2006.01)
(52) U.S. Cl. .............................. 701/68; 701/67; 477/166
(58) Field of Classification Search .................... 701/67, 701/68, 70, 74; 700/248, 249; 477/176, 477/180, 174
See application file for complete search history.

(56) References Cited

U.S. PATENT DOCUMENTS

| | | | | |
|---|---|---|---|---|
| 5,378,211 A * | 1/1995 | Slicker et al. | ................. | 477/175 |
| 6,602,161 B2 * | 8/2003 | Hemmingsen et al. | ......... | 477/79 |
| 6,746,366 B2 * | 6/2004 | Tamor | ................ | 477/5 |
| 6,811,515 B2 * | 11/2004 | Ibamoto et al. | ................. | 477/97 |
| 6,881,167 B2 * | 4/2005 | Inada | ................ | 475/5 |
| 2005/0283298 A1 * | 12/2005 | Ochi et al. | ..................... | 701/67 |
| 2006/0009900 A1 * | 1/2006 | Gerhart et al. | .................. | 701/67 |
| 2006/0041365 A1 * | 2/2006 | Mori | .............................. | 701/70 |

FOREIGN PATENT DOCUMENTS

| | | |
|---|---|---|
| DE | 693 09 003 T2 | 10/1997 |
| DE | 199 15 207 A1 | 10/2000 |
| DE | 100 32 366 A1 | 1/2002 |
| EP | 1 741 950 A1 | 1/2007 |

* cited by examiner

*Primary Examiner* — Thomas Black
*Assistant Examiner* — Shardul Patel
(74) *Attorney, Agent, or Firm* — Davis & Bujold, P.L.L.C.

(57) ABSTRACT

A method for determining a torque characteristic of a friction clutch located in a drive train of a motor vehicle in the force flow between a drive engine and a transmission and which is closed in its rest position. At least two marker points of a regulating-path-dependent torque characteristic are determined, one of which is determined at a slipping limit of the clutch. To enhance determination of the torque characteristic, a first marker point is determined with the clutch engaged, the transmission in neutral and the engine running, by slowly disengaging the clutch until a reduction in the speed of the transmission input shaft relative to the engine speed is detected. A corresponding pair of values of this marker point with the known braking torque of the input shaft and the set position are used for adapting an existing characteristic.

8 Claims, 2 Drawing Sheets

METHOD FOR DETERMINING A TORQUE CHARACTERISTIC OF AN AUTOMATED FRICTION CLUTCH

This application is a national stage completion of PCT/EP20071054011 filed Apr. 25, 2007, which claims priority from German Application Serial No. 10 2006 019 824.7 filed Apr. 28, 2006.

FIELD OF THE INVENTION

The invention concerns a method for determining a torque characteristic of an automated friction clutch arranged in a drive train of a motor vehicle in the force flow between a drive engine and a drive transmission and which is engaged in the rest position, such that at least two marker points $M\_K1(x\_K1)$, $M\_K2(x\_K2)$ of a regulating-path-dependent torque characteristic $M\_K=f(x\_K)$ are determined, of which at least one marker point is determined at a slippage limit of the friction clutch.

BACKGROUND OF THE INVENTION

The invention relates to all possible friction clutch structures that are engaged in the rest position. A generally known structural form with which the method, according to the invention, can preferably be applied, is a dry clutch that can be engaged passively by the action of a contact pressure spring and disengaged and engaged by way of a pressure-medium-actuated or electric-motor- or electromagnetically operated clutch control element. Another possible structural form is a dry clutch that can be actively engaged by the contact pressure of a controllable contact pressure element which, in the rest condition, i.e., when the motor vehicle is parked with its drive engine switched off, is held engaged by a contact pressure element acted upon by energy, for example by compressed air from a pneumatic pressure reservoir. Likewise, the method can be used with a wet clutch that can be actively or passively engaged, in particular a disk clutch.

With such friction clutches, the fundamental problem arises of determining a torque characteristic $M\_K=f(x\_K)$ which represents the transferable torque $M\_K$ of the friction clutch as a function of the regulating path $x\_K$ of an associated clutch control element, such as a hydraulic or pneumatic control cylinder or a transfer element connected thereto, such as a disengagement lever or release bearing, by way of which the desired transferable torque of the friction clutch is controlled.

Without any limitation of the invention to this type of structure, an example of a path-controlled dry clutch with spring contact pressure will be considered below, which can be disengaged and engaged by way of an associated clutch control element. In this case, the torque characteristic $M\_K=f(x\_K)$ concerned describes the clutch torque $M\_K$ as a function of a regulating path $x\_K$ of the clutch control element that corresponds to the disengagement path. Since, as is known, the respective regulating positions $x\_K$, associated with particular values of the clutch torque $M\_K$, can vary depending on the operating temperature and the wear condition, in particular of the friction linings of the friction clutch. For exact actuation control of the friction clutch it is necessary to precisely determine a torque characteristic $M\_K=f(x\_K)$ that corresponds to the situation at the time, i.e., to the momentary operating conditions.

For this purpose, it is known to determine at least two marker points $M\_K1(x\_K1)$ and $M\_K2(x\_K2)$ of the torque characteristic $M\_K=f(x\_K)$, of which at least one marker point is determined at a slippage limit of the friction clutch. The entire torque characteristic $M\_K=f(x\_K)$ can then be obtained by adapting an existing torque characteristic $M\_K'=f(x\_K)$ to the currently determined marker points $M\_K1(x\_K1)$ and $M\_K2(x\_K2)$ by projection of the torque values $M\_K1(x\_K1')$ and $M\_K2(x\_K2')$ concerned.

In this case, until now at least one of the marker points has been determined at a slippage limit in that with the friction clutch engaged, the transmission shifted to neutral and the drive engine running, the friction clutch is first completely disengaged; one then waits until the speed of the transmission input shaft has fallen far enough compared with the speed of the drive engine and, finally, the friction clutch is slowly engaged until an increase in the speed of the input shaft is sensed.

The pair of values $M\_K1$, $x\_K1$ determined at this point in time with the known braking torque $M\_B$ of the input shaft ($M\_K1=M\_B$) and the set position $x\_K(M\_B)$ is then stored as the value pair of the fixed point $M\_K1(x\_K1)$ and used for the adaptation of an existing characteristic $M\_K'=f(x\_K)$.

In this case, the braking torque $M\_B$ and, hence too the torque value $M\_K1$ concerned, is relatively small and corresponds to the drag torque of the input shaft, which is caused by bearing wear, rolling losses of meshing gearwheels and oil splash losses of the input shaft and of components connected to it. In addition, the drag torque is strongly temperature-dependent and increases as the operating temperature falls, in particular the oil temperature of the transmission. The disadvantage of this known method for determining a torque characteristic are the large number of process steps needed, the relatively long duration of the process sequence, which can lead to delays during normal driving operation of the motor vehicle, and the relatively poor precision of the fixed point determinations.

The purpose of the present invention is to indicate a method for determining a torque characteristic of an automated friction clutch of the type mentioned to begin with, by way of which at least one of the marker points $M\_K1(x\_K1)$, $M\_K2(x\_K2)$ of the torque characteristic $M\_K=f(x\_K)$ can be determined more simply, more rapidly and with greater precision.

SUMMARY OF THE INVENTION

Accordingly, the invention concerns a method for determining a torque characteristic of an automated friction clutch arranged in a drive train of a motor vehicle in the force flow between a drive engine and a drive transmission, and which is engaged in its rest position, such that at least two marker points $M\_K1(x\_K1)$ and $M\_K2(x\_K2)$ of a regulating-path-dependent torque characteristic $M\_K=f(x\_K)$ are determined, of which at least one marker point is determined at a slippage limit of the friction clutch.

In contrast to the known method, in this case it is provided that a first marker point $M\_K1(x\_K1)$ is determined, in that with the friction clutch engaged, the transmission in neutral and the drive engine running, the friction clutch is slowly disengaged until a speed decrease of the transmission input shaft, compared with the speed of the engine, is sensed and the corresponding pair of values $M\_K1$, $x\_K1$ with the known braking torque $M\_B$ of the input shaft and the set position $x\_K(M\_B)$ determined are noted, stored as the value pair for the marker point $M\_K1(x\_K1)$, and then used for adapting an existing characteristic $M\_K'=f(x\_K)$.

Thus, the marker point $M\_K1(x\_K1)$ is already determined during the process of disengaging the friction clutch, for example when the motor vehicle is first operated after starting the engine and before the starting gear has even been engaged and, therefore, substantially more quickly than usual until now.

Since the drag torque, acting on the input shaft as a braking torque $M\_B$ during the determination of the first marker point $M\_K1(x\_K1)$, is essentially temperature-dependent, i.e., it increases as the operating temperature of the transmission decreases, for a precise determination of the drag torque, it is expedient to sense the operating temperature of the transmission.

Moreover, the determination of the first marker point $M\_K1(x\_K1)$ can be accelerated, at the latest before the slippage limit of the friction clutch is reached, if a transmission brake that acts upon the input shaft of the transmission or a synchronization device of a transmission gear is actuated. In this case, the braking torque $M\_B$ that acts upon the transmission input shaft is formed by the sum of the drag torque and the braking torque of the transmission brake or synchronization device. Consequently, the torque value $M\_K1$ determined is larger in such a case, but can be determined more accurately because the operating temperature and the measurement errors have less effect.

A second marker point $M\_K2(x\_K2)$ is preferably determined in such a manner that in the partially engaged condition the friction clutch is actuated in the engaging direction until no further change of the regulating path $x\_K$ is sensed and the corresponding pair of values $M\_K2$, $x\_K2$ with the known maximum torque $M\_K\_max$ and the determined set position $x\_K=0$ are noted, stored as the value pair of the second marker point $M\_K2(x\_K2)$ and then used for adapting the existing characteristic $M\_K'=f(x\_K)$.

The position range, between the two marker points $M\_K1(x\_K1)$ and $M\_K2(x\_K2)$ determined in this manner, is appropriately defined as the working range of the friction clutch for producing torque values $M\_K1(x\_K1)$ with $M\_K1(x\_K1)=0\%$ and $M\_K2(x\_K2)=100\%$. This then makes it possible to produce a desired, discrete torque value $M\_K1$ and a desired time variation of the clutch torque $M\_K$, for example for starting, maneuvering, shifting and stopping.

BRIEF DESCRIPTION OF THE DRAWINGS

The invention will now be described, by way of example, with reference to the accompanying drawings in which.

DETAILED DESCRIPTION OF THE INVENTION

Figure 2:
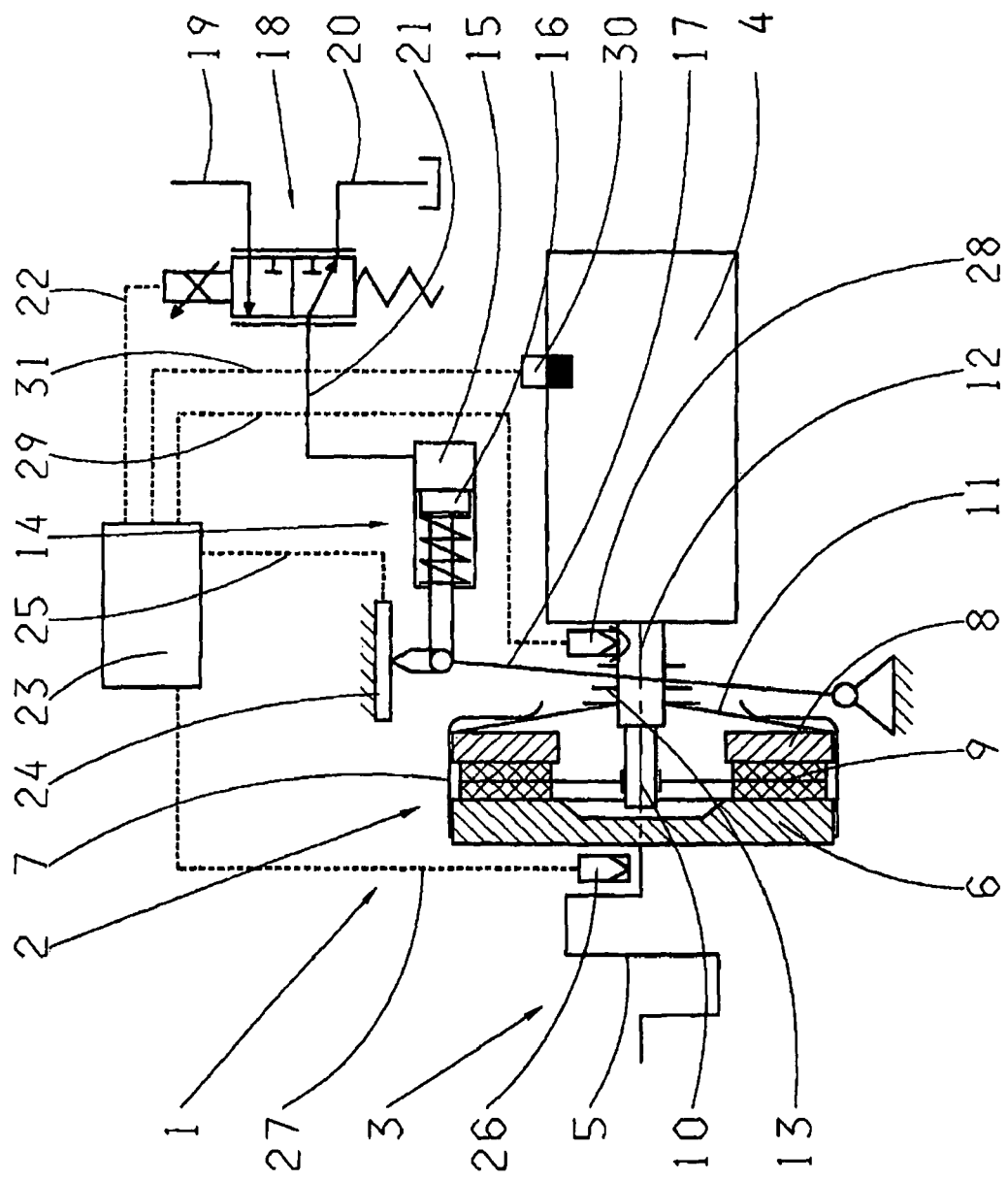
FIG. 2 is a clutch arrangement for implementing the method according to the invention.

FIG. 2 shows an example of a clutch arrangement 1 for implementing a method according to the invention. In the Figure, a friction clutch 2, made as a single-disk, dry clutch, is shown arranged in the force flow between a drive engine 3 made as a piston-driven internal combustion engine and a drive transmission 4.

The part of the friction clutch 2 on its input side is formed by a flywheel 6 attached to a crankshaft 5 of the drive engine 3 and a pressure plate 8 connected thereto via a clutch cage 7. The part of the friction clutch 2 on its output side is formed by a carrier disk 9 arranged axially between the flywheel 6 and the pressure plate 8, which is mounted rotationally fixed to, but able to move axially on an input shaft 10 of the transmission 4. By virtue of a contact pressure spring 11 made as a membrane spring and arranged between the clutch cage 7 and the pressure plate 8, the friction clutch 2 is engaged in its rest position free from any control force, but can be disengaged and engaged by way of a release bearing 13 mounted to move axially on a guide sleeve 12 fixed on the housing, which contacts radially inner spring tabs of the contact pressure spring 11.

The release bearing 13 is actuated and a given clutch torque $M\_K$ of the friction clutch 2 is produced by a pressure-medium-actuated clutch control element 14, in this case in the form of a simply acting control cylinder with a piston 16, mounted to move axially and displaced by a control pressure $p\_K$, that acts in a pressure chamber 15 and pushes the piston against the restoring force of a restoring spring. Via a piston rod and a disengagement lever 17 mounted on the housing at its end, the piston 16 is connected to the release bearing 13 in such a manner that increasing the control pressure $p\_K$ results in disengagement of the friction clutch 2 and hence in a reduction of the clutch torque $M\_K$.

The clutch control element 14 is actuated by a control valve 18 in the present case formed as a 3/2-way proportional magnetic valve with two inlets and one outlet. The first inlet is connected to a pressure line 19; the second inlet to an unpressurized line 20 and the outlet, via a connection line 21, to the pressure chamber 15 of the clutch control element 14. To actuate the control valve 18, the latter is connected via an electric control line 22 to a control unit 23. Thus by way of the structure, a change of the clutch torque $M\_K$ is brought about by a continuous variation of the control pressure $p\_K$ of the clutch control element 14.

To detect the set position $x\_K$ of the piston 16 or the disengagement lever 17, a path sensor 24 is arranged on the piston rod of the piston 16. To determine the input speed of the friction clutch 2, a first speed sensor 26 is arranged on the crankshaft 5 of the drive engine 3 while, to determine the output speed of the friction clutch 2, a second speed sensor 28 is provided on the input shaft 10 of the drive transmission 4. To determine the operating temperature of the transmission 4, a temperature sensor 30 is positioned in the oil sump of the transmission 4. The sensors 24, 26, 28, 30 are connected to the control unit 23 by respective sensor leads 25, 27, 29, 31.

Figure 1:
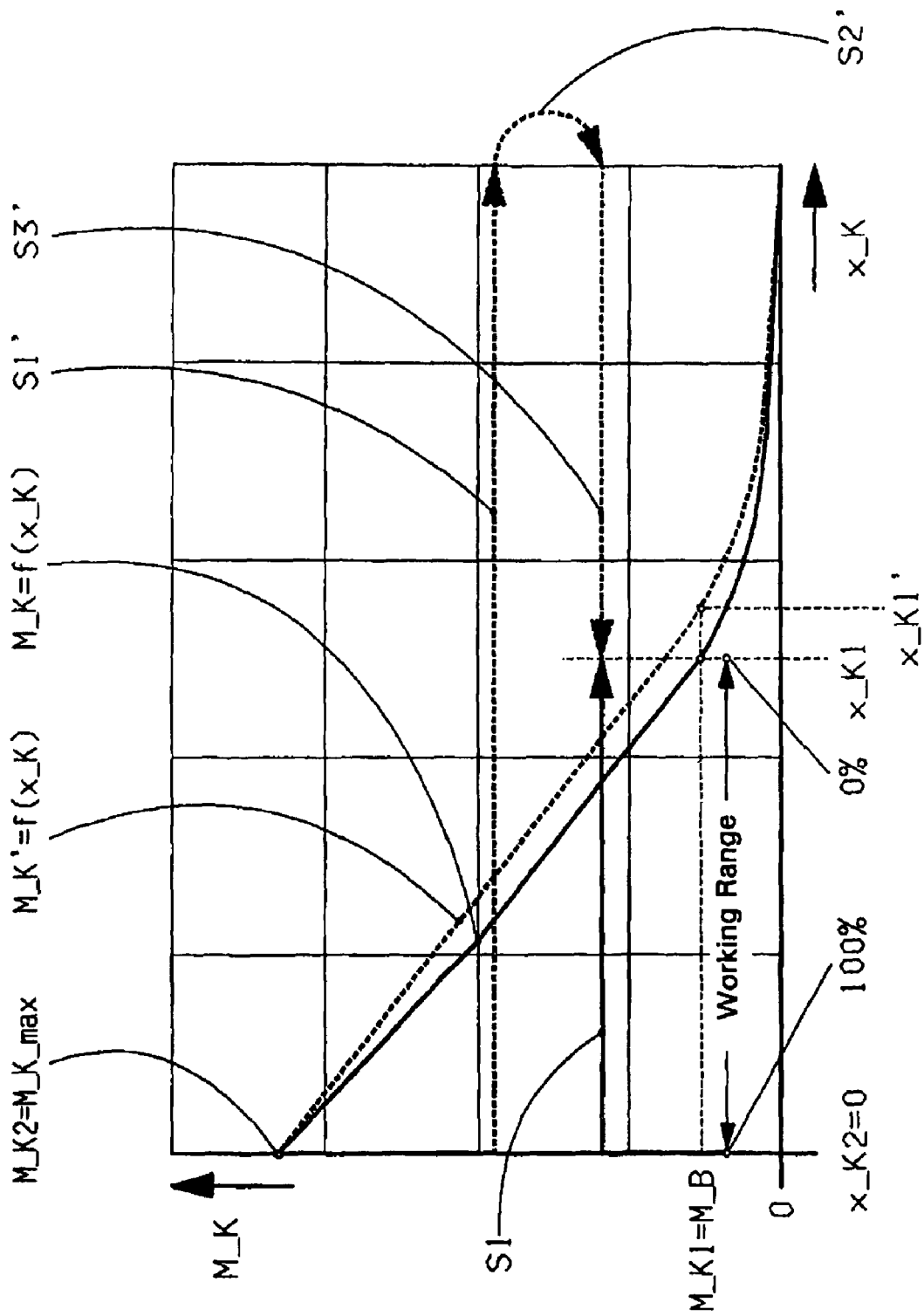
FIG. 1 is a diagram of the clutch torque of a friction clutch as a function of regulating path.

In the diagram of FIG. 1, for the clutch arrangement 1 according to FIG. 2, a regulating-path-dependent torque characteristic $M\_K=f(x\_K)$, representing the variation of the clutch torque $M\_K$ as a function of the regulating path $x\_K$, is shown (continuous line), which is obtained from an adaptation of an existing torque characteristic $M\_K'=f(x\_K)$ by projecting two torque values $M\_K1(x\_K1')$, $M\_K2(x\_K2')$ of the existing characteristic $M\_K'=f(x\_K)$ onto two determined marker points $M\_K1(x\_K1)$ and $M\_K2(x\_K2)$.

Until now, to determine a first marker point $M\_K1(x\_K1)$ of the torque characteristic $M\_K=f(x\_K)$, the usual procedure has been with the friction clutch 2 engaged, the transmission 4 in neutral and the drive engine 3 running, first, to completely disengage the friction clutch 2, then to wait until the speed of the input shaft 10 of the transmission 4 has fallen far enough, compared with the speed of the drive engine 3, and then to slowly engage the friction clutch 2 until an increase in the speed of the input shaft 10 is sensed. The pair of values $M\_K1$, $x\_K1$ determined at that time with a known braking torque $M\_B$ of the input shaft ($M\_K1=M\_B$) and the detected set position $x\_K(M\_B)$ is then stored as the value pair of the marker point $M\_K1(x\_K1)$ and used for adapting or modifying the existing characteristic $M\_K'=f(x\_K)$. This known method, which is illustrated in FIG. 1 by the steps S1' to S3', takes a relatively long time and demands considerable control effort.

In contrast, according to the invention, the method provides that with the friction clutch 2 engaged, the transmission 4 in neutral and the drive engine 3 running, to determine a first marker point M_K1(x_K1) of the torque characteristic M_K=f(x_K) the friction clutch 2 is slowly disengaged until a drop in the speed of the input shaft 10 of the transmission 4 compared with the speed of the drive engine 3 is sensed, and then the corresponding pair of values M_K1, x_K1 with the known braking torque M_B of the input shaft (M_K1=M_B) and the set position x_K(M_B) are noted, stored as the value pair for the marker point M_K1(x_K1), and used for adapting the existing characteristics M_K'=f(x_K). The method, which is illustrated in FIG. 1 by the single step S1 (symbolized by the arrow drawn with a continuous line), takes up much less time and demands less control effort.

Without having to adopt any further measures, the braking torque M_B of the input shaft 10 and also the torque value M_K1 concerned, correspond to the drag torque of the input shaft 10. This drag torque is comparatively small and also markedly temperature-dependent so it can only be determined relatively approximately. However, the drag torque of the input shaft 10 can be determined with greater precision if the operating temperature of the transmission 4 is determined by the temperature sensor 30, if possible arranged in the oil sump of the transmission, as shown in FIG. 2.

The measured marker point M_K1(x_K1) can be corrected as a function of the drag torque.

A further increase of accuracy when determining the effective braking torque M_B can be achieved by increasing the latter, since measurement errors then have a smaller effect. To do this, it can be provided that at the latest before the slippage limit is reached, i.e., before the speed of the input shaft 10 decreases, an additional transmission brake or a synchronization device of a gear of the transmission 4 that acts upon the input shaft 10 is actuated.

In the present case, a second marker point M_K2(x_K2) is determined by actuating the friction clutch 2 in its partially engaged condition in the engaging direction until no further change of the regulating path x_K is sensed, noting the corresponding pair of the values M_K2, x_K2 with a known maximum torque M_K_max and the set position x_K(M_K_max) or x_K=0, then storing the marking point M_K2(x_K2) as a value pair, and then using the point for adapting the existing characteristic M_K'=f(x_K).

The path range, between the marking points M_K1(x_K1) and M_K2(x_K2), can be defined as the working range of the friction clutch 2, as illustrated in FIG. 1 in which the set position x_K1, x_K2, are marked 0% and 100% respectively, since within this range, which is relevant for practical operation the torque of the friction clutch 2, can be adjusted with great precision.

| Reference numerals | |
|---|---|
| 1 | clutch arrangement |
| 2 | friction clutch |
| 3 | drive engine |
| 4 | drive transmission |
| 5 | crankshaft |
| 6 | flywheel |
| 7 | clutch cage |
| 8 | pressure plate |
| 9 | carrier disk |
| 10 | input shaft |
| 11 | contact pressure spring |
| 12 | guide sleeve |
| 13 | release bearing |
| 14 | clutch control element |
| 15 | pressure chamber |

| -continued | |
|---|---|
| Reference numerals | |
| 16 | piston |
| 17 | disengagement lever |
| 18 | control valve |
| 19 | pressure line |
| 20 | unpressurized line |
| 21 | connection line |
| 22 | control line |
| 23 | control unit |
| 24 | path sensor |
| 25 | sensor lead |
| 26 | first speed sensor |
| 27 | sensor lead |
| 28 | second speed sensor |
| 29 | sensor lead |
| 30 | temperature sensor |
| 31 | sensor lead |
| M_B | braking torque |
| M_K | clutch torque |
| M_K' | clutch torque |
| M_Ki | (discrete) torque value |
| M_K1 | torque value of the first marker point |
| M_K2 | torque value of the second marker point |
| M_K_max | maximum torque |
| p_K | control pressure |
| S1 | step 1 |
| S1' | step 1 |
| S2' | step 2 |
| S3' | step 3 |
| x_K | regulating path, set position |
| x_Ki | (discrete) set position |
| x_K1 | set position of the first marker point |
| x_K1' | set position of the first projected marker point |
| x_K2 | set position of the second marker point |
| x_K2' | set position of the second projected marker point |

The invention claimed is:

1. A method for determining a torque characteristic of an automated friction clutch located in a drive train of a motor vehicle in power flow between a drive engine (3) and a drive transmission (4) and which is engaged in a resting position such that at least first and second marker points (M_K1 (x_K1), M_K2(x_K2)) of a regulating-path-dependent torque characteristic (M_K=f(x_K)) are determined, of which at least one marker point is determined at a slippage limit of the friction clutch (2), the first marker point (M_K1 (x_K1)) is determined with the friction clutch (2) engaged, the transmission (4) in neutral and the drive engine (3) running, by disengaging the friction clutch (2) slowly until a reduction in speed of an input shaft (10) of the transmission (4) relative to a speed of the drive engine (3) is sensed, noting a corresponding pair of values (M_K1, x_K1) of the first marker point with a known braking torque (M_B) of the input shaft (10) and a set position (x_K(M_B)) determined, storing the pair of values of the first marker point (M_K1 (x_K1)), and then using the pair of values of the first marker point (M_K1(x_K1)) for adapting an existing characteristic (M_K'=f(x_K)), and for an accurate determination of a drag torque as the braking torque (M_B) of the input shaft (10), an operating temperature of the transmission (4) is sensed.

2. The method for determining the torque characteristic according to claim 1, further comprising the step of actuating a transmission brake that acts upon the input shaft (10) of the transmission (4) before reaching the slippage limit of the friction clutch (2).

3. The method for determining the torque characteristic according to claim 1, further comprising the step of actuating a synchronization device of a gear of the transmission (4) before reaching the slippage limit of the friction clutch (2).

4. The method for determining the torque characteristic according to claim 1, further comprising the steps of:
- determining the second marker point (M_K2(x_K2)) by actuating the friction clutch in the engaged condition in an engaging direction until no further change of the regulating path (x_K) is detected;
- noting a second corresponding pair of values of the second marker point (M_K2, x_K2) with a known maximum torque (M_K_max) and the set position equal to zero (x_K=0) determined;
- storing the second corresponding pair of values of the second marker point (M_K2, x_K2) as the pair of values for the second marker point (M_K2(x_K2)); and
- using the second corresponding pair of values of the second marker point (M_K2, x_K2) for adapting the existing characteristic (M_K'=f(x_K)).

5. A control device for determining a torque characteristic of an automated friction clutch located in a drive train of a motor vehicle in force flow between a drive engine (3) and a drive transmission (4) and which is engaged in a resting position, the control device comprising:
- at least first and second marker points (M_K1(x_K1), M_K2(x_K2)) of a regulating-path-dependent torque characteristic (M_K=f(x_K)) are determined, of which at least one marker point is determined at a slippage limit of the friction clutch (2), the first marker point (M_K1 (x_K1)) is determined with the friction clutch (2) engaged, the transmission (4) in neutral and the drive engine (3) running, by disengaging the friction clutch (2) slowly until a reduction in speed of an input shaft (10) of the transmission (4) relative to a speed of the drive engine (3) is sensed, noting a corresponding pair of values (M_K1, x_K1) of the first marker point with a known braking torque (M_B) of the input shaft (10) and a set position (x_K(M_B)) determined, storing the pair of values of the first marker point (M_K1(x_K1)), and then using the pair of values of the first marker point (M_K1(x_K1)) for adapting an existing characteristic (M_K'=f(x_K)), and for an accurate determination of a drag torque as the braking torque (M_B) of the input shaft (10), an operating temperature of the transmission (4) is sensed and a path range between the first and the second marker points (M_K1(x_K1), M_K2(x_K2)) is defined as a working range of the friction clutch for producing torque values (M_Ki(x_Ki)), with the first marker point (M_K1(x_K1)) being equal to 0% and the second marker point (M_K2(x_K2)) being equal to 100%.

6. The control device according to claim 5, wherein the first marker point (M_K1(x_K1)) is corrected as a function of the drag torque of the input shaft (10) of the transmission (4).

7. A method for determining a torque characteristic of an automated friction clutch (2), which is located between a drive engine (3) and a drive transmission (4) in a drive train of a motor vehicle and which is engaged in an idle state, the method comprising the steps of:
- initiating the method when the friction clutch (2) is engaged, the transmission (4) is in a neutral state and the drive engine (3) is running;
- monitoring torque (M_K) transmitted through the clutch (2), braking torque (M_B) on a transmission input shaft (10), an axial position (x_k) of a slidable clutch pressure plate (8), an operating temperature of the transmission (4), a speed of the drive engine (3) and a speed of the transmission input shaft (10);
- disengaging the friction clutch (2);
- detecting the torque (M_K) transmitted through the clutch (2), the braking torque (M_B) on the transmission input shaft (10), the operating temperature of the transmission (4) and the axial position (x_k) of the slidable clutch pressure plate (8) when the speed of the transmission input shaft (10) is unaffected by the speed of the drive engine (3);
- defining the axial position (x_k) of the slidable clutch pressure plate (8) when the speed of the transmission input shaft (10) is unaffected by the speed of the drive engine (3) as a first marker point (M_K1(x_K1)); and
- adapting a preexisting torque characteristic (M_K'=f (x_K)) as a function of the torque (M_K) transmitted through the clutch (2), the braking torque (M_B) on the transmission input shaft (10) and the operating temperature of the transmission (4) at the first marker point (M_K1(x_K1)).

8. The method for determining the torque characteristic according to claim 7, further comprising the steps of:
- engaging the clutch (2);
- detecting the torque (M_K) transmitted through the clutch (2), the braking torque (M_B) on the transmission input shaft (10), the operating temperature of the transmission (4) and the axial position (x_k) of the slidable clutch pressure plate (8) when movement of the slidable clutch pressure plate (8) stops;
- defining the axial position (x_k) of the slidable clutch pressure plate (8) when movement of the slidable clutch pressure plate (8) stops as a second marker point (M_K2 (x_K2));
- identifying the torque (M_K) transmitted through the clutch (2) and the axial position (x_k) of the slidable clutch pressure plate (8) at the second marker point (M_K2(x_K2)) respectively as a maximum torque (M_K_max) and a set position (x_K=0);
- further adapting the preexisting torque characteristic (M_K'=f(x_K)) as a function of the torque (M_K) transmitted through the clutch (2), the braking torque (M_B) on the transmission input shaft (10) and the operating temperature of the transmission (4) at the second marker point (M_K2(x_K2));
- recognizing an axial distance between the first marker point (M_K1(x_K1)) and the second marker point (M_K2(x_K2)) as a working range of the friction clutch (2); and
- calculating torque values (M_Ki(x_Ki) based on the torque (M_K) transmitted over the working range of the friction clutch (2).

* * * * *